United States Patent [19]
Egloff

[11] Patent Number: 5,181,949
[45] Date of Patent: Jan. 26, 1993

[54] PUSH OUT DEVICE FOR A GLASSWARE FORMING MACHINE

[75] Inventor: Beat Egloff, Winterthur, Switzerland

[73] Assignee: Emhart Glass Machinery Investments, Inc., Wilmington, Del.

[21] Appl. No.: 772,260

[22] Filed: Oct. 7, 1991

[30] Foreign Application Priority Data

Oct. 24, 1990 [GB] United Kingdom ................. 9023103

[51] Int. Cl.⁵ ...................... C03B 9/453; B65G 47/52
[52] U.S. Cl. ........................... 65/375; 65/171; 65/260; 198/468.01; 198/740
[58] Field of Search ..................... 65/171, 260, 375; 198/468.01, 740

[56] References Cited

U.S. PATENT DOCUMENTS

| | | | |
|---|---|---|---|
| 3,559,537 | 2/1971 | Faure | 198/468.01 |
| 4,199,344 | 4/1980 | Mumford et al. | 65/260 |
| 4,340,413 | 7/1982 | Rowland | 65/375 |
| 4,771,878 | 9/1988 | Braithwaite et al. | 198/468.01 |

*Primary Examiner*—Joye L. Woodard
*Attorney, Agent, or Firm*—Spencer T. Smith

[57] ABSTRACT

A push out device for a glass container making machine has a series of pusher fingers mounted on a pusher head arranged for the conventional extended and retracted movement and rotation about a vertical axis. The pusher fingers are mounted in a support plate of the pusher head so that the spacing between a base of the pusher head and the support plate may readily be adjusted.

5 Claims, 2 Drawing Sheets

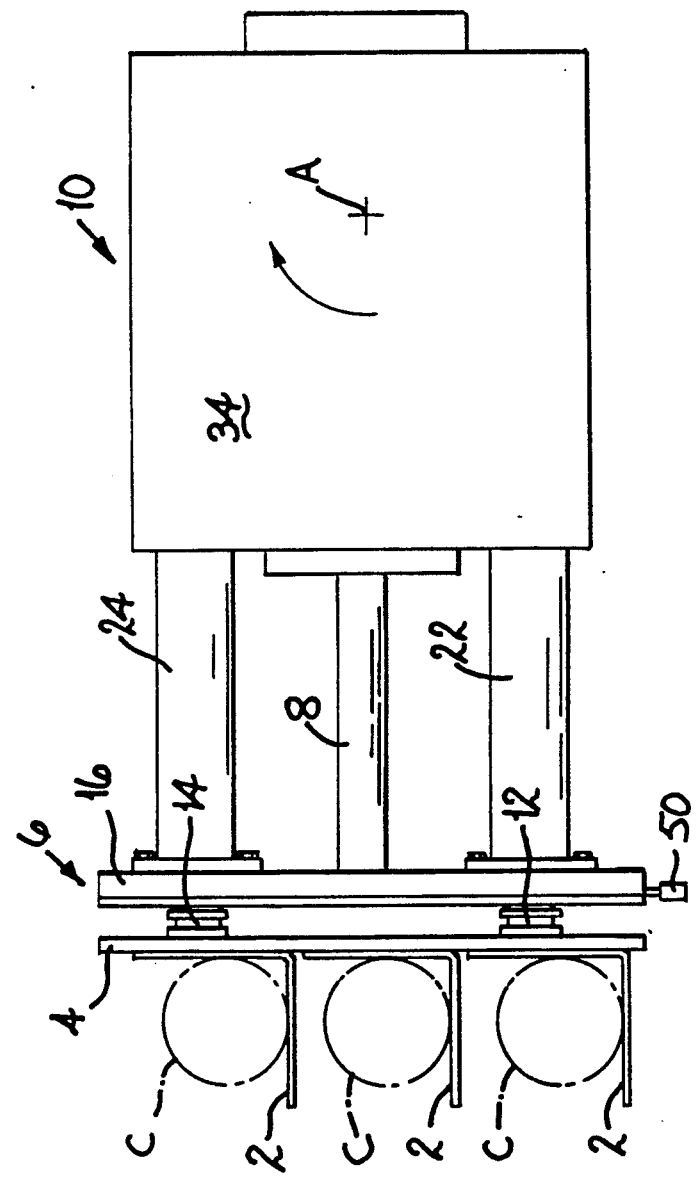

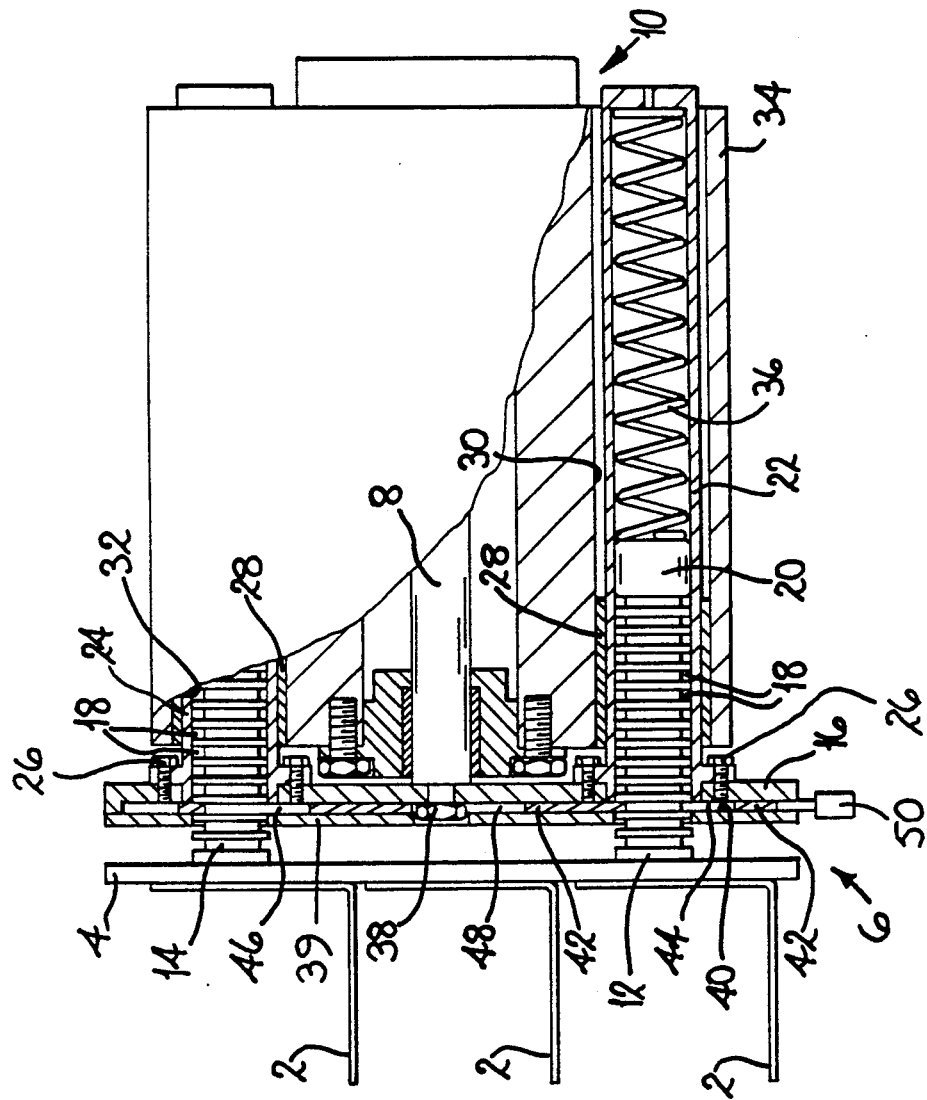

PUSH OUT DEVICE FOR A GLASSWARE FORMING MACHINE

BACKGROUND OF THE INVENTION

The present invention relates to a push out device for a glassware forming machine.

Push out devices conventionally comprise container engaging fingers which are mounted on a pusher head. A piston and cylinder device operates to move the head between an operative, extended position and a retracted position, and rotary means is provided for rotating the piston and cylinder device about a vertical axis. In the operation of the pusher device, the pusher head begins in a retracted position facing a dead plate of the glassware forming machine. The piston and cylinder then operates to extend between newly formed containers deposited on the dead plate, the rotary means then operates to rotate the piston and cylinder device through about 90° to carry the container off the dead plate onto a conveyor of the machine, the pusher head is then moved by the piston and cylinder device into its retracted position, disengaging from the containers and the piston and cylinder device is then rotated to bring the pusher head in its position facing the dead plate.

It is desirable, on a change of size of container being manufactured by the forming machine, to be able to adjust the extended position of the pusher fingers on the pusher head appropriately to the container being deposited on the dead plate. This adjustment is desirably carried out rapidly, and on occasion without stopping operation of the machine.

In U.S. Pat. No. 3,559,537 a push out device is shown in which the pusher fingers are each mounted on a slotted bracket and are secured in position by a bolt. Thus to adjust the extended position of the pusher fingers it is necessary to undo the bolt relating to each pusher finger, adjust its position and retighten the bolt—necessarily a time consuming and awkward operation.

It is an object of the present invention to provide a push out device in which the extended position of the pusher fingers can readily be adjusted.

SUMMARY OF THE INVENTION

A push out device for use in a glassware forming machine to remove moulded containers from a dead plate of the machine to a conveyor comprising a piston and cylinder device comprising a piston rod a pusher head mounted on the piston rod for movement between an operative, extended, position and a retracted position, means for rotating the piston and cylinder device about a vertical axis between an orientation in which the pusher head faces the dead plate conveyor, the pusher head comprising, a support plate, one or more container engaging fingers mounted on the support plate, a base secured to the piston rod of the piston and cylinder device, supporting rods extending through the base and parallel to the piston rod and secured to the support plate, securing means mounted on the base and movable between a position in which it engages the supporting rods to lock said rods relative to the base and a position in which said rods are not so locked and the spacing between the base and the supporting plate may be adjusted.

There now follows a description, to be read with reference to the accompanying drawings, of a push out device which has been selected for description to illustrate the invention by way of example.

BRIEF DESCRIPTION OF THE DRAWINGS

In the accompanying drawings

FIG. 1 is a plan view of a push out device with a pusher head in its extended position.

FIG. 2 is a plan view, partly in section, of the device shown in FIG. 1, with the pusher head in a retracted position.

DETAILED DESCRIPTION OF THE PREFERRED EMBODIMENT

FIGS. 1 and 2 show a push out device which is adapted for use with a glassware forming machine to remove moulded glass containers from a dead plate of the machine (not shown) onto which newly formed containers are deposited to a conveyor by which the containers are carried away for further treatment, for example inspection and packing.

The push out device comprises three container engaging fingers 2, which is appropriate for use with a triple gob forming machine, but may of course comprise 1, 2 or 4 such fingers as appropriate. The fingers 2 are mounted on a support plate 4 of a pusher head 6. The pusher head 6 is mounted on a piston rod 8 of a piston and cylinder device 10 which operates to move the head 6 between an operative extended position (shown in FIG. 1) and a retracted position (shown in FIG. 2). The device also comprises rotary means (not shown) for rotating the piston and cylinder device about an axis A (FIG. 1). In the operation of the pusher device, the pusher head begins in a retracted position facing the dead plate. The piston and cylinder then operates to extend the pusher head 6 so that the fingers 2 move between containers C on the dead plate, the rotary means operates to rotate the piston and cylinder device through about 90° into an orientation in which the pusher head 6 faces the conveyor, the pusher head is then moved by the piston and cylinder device into its retracted position to remove the fingers 2 from between the containers C and is then rotated back into a orientation facing the dead plate.

The support plate 4 is mounted on two supporting rods 12, 14 which extend through a base 16 of the pusher head 6. The rods 12 and 14 each comprises a series of equally spaced circumferential recesses 18, which recesses 18 are spaced along the length of the rods between the support plate 4 and a head 20 of each rod (only one of which is shown). The rods 12,14 extend into cylindrical supporting sleeves 22, 24 which are secured by screws 26 to the base 16. The sleeves 22, 24 are mounted for axial sliding movement in bearings 28, 28 secured in bores 30,32 in a housing 34 of the piston and cylinder device 10. A spring 36 in the sleeve 22 urges the supporting rod 12 outwards—a similar spring (not shown) acts on the rod 14 in the sleeve 24.

The base 16 is secured to the piston rod 8 by a screw 38. Secured to the base 16 is a cover plate 39, a slideway 40 being formed between the cover plate 39 and the base 16. Mounted in the slideway 40 is a securing device which is in the form of a plate 42. The plate is provided with three apertures, an aperture 44 surrounding the supporting rod 12, an aperture 46 surrounding the supporting rod 14 and an aperture 48 surrounding the head of the screw 38. In FIG. 2 the plate 42 is shown in position in which it engages the supporting rods 12,14 to secure them in position with respect to the base 16, the edge of the aperture 44 being engaged in one of the recesses 18 on the rod 12, and that of the aperture 46 in one of the recesses 18 on the rod 14. It will be understood that the thickness of the plate 42 is chosen so that it can readily be firmly engaged in the recesses 18.

Secured to the plate 42 is a small handle 50.

When an operator wishes to adjust the distance between the support plate 4 and the base 16, he operates the handle 50 to slide the plate 42 in the slideway 40 to disengage the plate 42 from the recesses 18, moves the support plate 4 into the desired spacing from the base 6, and then re-engages the plate 42 in the recesses 18 to lock the support plate 4 in the desired position. If desired a latch may be fitted to prevent inadvertent movement of the plate 42.

It will be realized that if it is desired to provide a different array of container engaging fingers 2, differing either in number or in spacing, the operator may, when he has disengaged the plate 42 from the recesses 18, remove the assembly of the fingers 2, the support plate 4, and the supporting rods 12 and 14 from the push out device and replace it with a similar assembly having the desired array of container engaging fingers.

I claim:

1. A push out device for use in a glassware forming machine to remove molded containers from a dead plate of the machine to a conveyor, comprising
   a piston and cylinder device including a piston rod,
   a pusher head mounted on said piston rod for movement between an operative, extended, position and a retracted position, including
   a support plate,
   at least one container engaging finger mounted on said support plate,
   a base secured to said piston rod,
   a plurality of supporting rods extending through said base and parallel to said piston rod and secured to said support plate, and
   securing means mounted on said base and movable between a first position engaging said supporting rods to lock said rods relative to said base and a second position releasing said rods so that the spacing between said base and said supporting plate may be adjusted.

2. A push out device according to claim 1, further comprising cylindrical supporting sleeves secured to said base for receiving said supporting rods.

3. A push out device according to claim 2 wherein said piston and cylinder device further comprises a corresponding plurality of bores parallel to said piston rod for receiving said supporting sleeves.

4. A push out device according to claim 1 wherein each of said supporting rods comprises a series of recesses and said securing means is a plate mounted for sliding movement on said base including apertures through which said supporting rods pass, said plate being movable into and out of engagement with said recesses.

5. A push out device according to claim 4 wherein said series is equally spaced.

* * * * *